N. MELLAND.
SEED DRILL.
APPLICATION FILED AUG. 9, 1918.
1,291,995.
Patented Jan. 21, 1919.
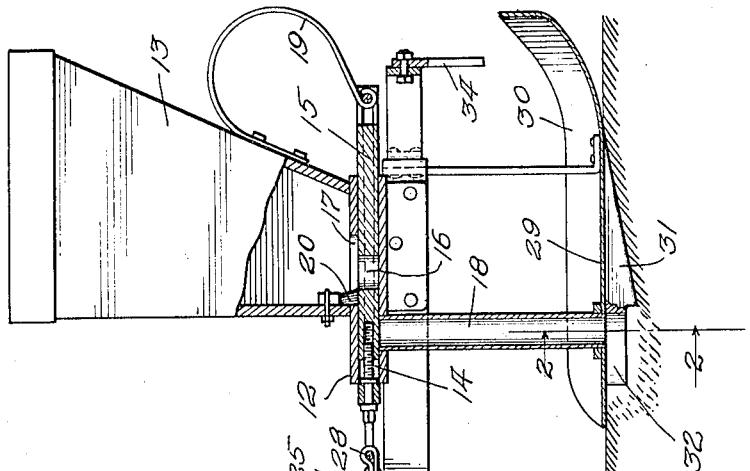
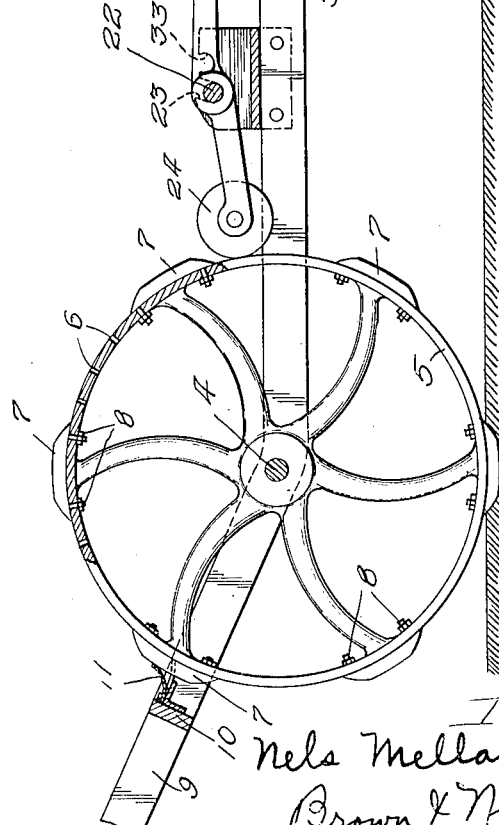
Inventor,
Nels Melland
By Brown & Nissen
Attys.
Witness:
R. L. Jarrington

UNITED STATES PATENT OFFICE.

NELS MELLAND, OF SAWYER, WISCONSIN.

SEED-DRILL.

1,291,995.　　　　　　Specification of Letters Patent.　　Patented Jan. 21, 1919.

Application filed August 9, 1918. Serial No. 249,089.

*To all whom it may concern:*

Be it known that I, NELS MELLAND, a citizen of the United States, residing at Sawyer, in the county of Door and State of Wisconsin, have invented certain new and useful Improvements in Seed-Drills, of which the following is a specification.

My invention relates to seed drills, and has for its object the provision of a simple and efficient seed drill.

A further object is the provision of a seed drill having simple operating means for the seed dropping parts.

Other objects will appear hereinafter.

An embodiment of my invention is shown in the accompanying drawing forming a part of this specification, and in which—

Figure 1 is a longitudinal section of a seed drill embodying my invention; and

Fig. 2 is a fragmental section taken on line 2—2 of Fig. 1.

Referring more particularly to the drawing, I have indicated a frame 3, formed of any suitable material, such as iron bars. Near the rear portion of the frame I provide a shaft 4 on which is mounted a ground wheel 5. The wheel 5 may be mounted loosely on the shaft 4, or the shaft 4 may be mounted loosely in the frame, as desired.

In the periphery of the wheel 5 I provide a plurality of perforations 6 which are spaced apart any desired distances, and any desired number of the perforations 6 may be provided. On the ground-engaging surface or periphery of the wheel 5 I provide a plurality of cams 7, each of which is preferably removably secured to the wheel. A simple means of removably securing the cams 7 to the wheel 5 is indicated by bolts or studs 8 which pass through the perforations 6. Any other desirable means may be provided.

At the rear of the frame 3 I have shown the lower portions of handles 9, which may be continuations of the frame 3, or formed in any other desirable manner. Between the handles 9, one of which is shown in the drawing, I provide a cross-member 10, to which is attached a cleaner 11, which may be formed of thin resilient metal, or any other desirable substance. The cleaner 11 is mounted in such a manner as to engage the periphery of the wheel 5 and the outer surfaces of the cams 7 so that any dirt or earth which may be sticking to said wheel and the cams will be cleaned off.

At the front end of the frame 3 I provide a base member 12 on which is mounted a seed container 13. The base 12 is provided with a longitudinal opening 14 in which is slidably mounted a seed dropper 15. The seed dropper 15 has an opening 16 therethrough which is adapted to alternately register with an opening 17 in the bottom of the seed container 13 and the opening of a seed conveying tube 18. The seed dropper 15 is moved forwardly of the drill by a resilient member 19. The member 19 may be a steel spring, or any other desirable means. In the seed container 13 I provide a brush 20 which is adapted to prevent the seeds held in the container 13 from being injured by the member 15 when the latter is moved from the position indicated to a position where the opening 16 will be directly over the opening of the tube 18. It will be seen that the dropper 15 catches a number of seeds, sufficient to fill the opening 16, and upon movement under the brush 20 carries the seeds over until they drop by gravity into the tube 18. The member 19 then brings the dropper 15 to the position indicated.

For moving the seed dropper 15 in a direction rearwardly of the drill, I provide a lever 21 which is preferably mounted on a shaft 22, which is in turn mounted in bearings 23 on the frame. I have shown the lever 21 as provided with a roller 24 which is adapted to engage the cams 7 to cause the lever 21 to move in a vertical plane as the wheel 5 revolves. It will be apparent that the roller 24 may be dispensed with when so desired, and the end of lever 21 extended so that such end will engage the cams 7 and accomplish the same result as though the roller 24 was supplied, as illustrated. The other end of the lever 21 is secured to a flexible member 25. The member 25 may be a strap of leather, or any other desirable substance. The member 25 passes under a roller 26 which is journaled in bearing members 27 on the frame 3 and has its other end secured to a member 28. The member 28 is adjustably secured to the dropper 15 so that an adjustment may be made between the flexible member 25 and the dropper 15 to get proper registration between the opening 16 and the opening 17 and dropper tube 18. As the lever 21 is moved vertically, it draws the strap 25 around the pulley 26 and pulls the dropper 15 over until the perforation 16 registers with the tube 18, then as a cam 7 passes out of engagement with the roller 24, the spring 19 returns the parts 24, 21, 25, 28 and 15 to the positions indicated.

At the bottom of the tube 18 I provide a shoe 29 which preferably has a flat bottom and its front end turned upwardly, somewhat resembling a sled runner, so as to smooth off the ground where the row of seeds are to be planted. The edges of the shoe 29 are preferably upturned as at 30 to prevent the ground from falling over on the top of the shoe 29. On the bottom of the shoe 29 I provide a furrow opener 31 which has its rear ends 32 spread apart to form the furrow for the seeds to drop in. The tube 18 is in open communication with the space between the parts 32 of the furrower. The ground wheel 5 is adapted to cover the seeds after such seeds have been dropped.

The opening 16 in the dropper may be formed in any desirable size to accommodate desired seeds, and the drill may be made in small sizes for hand use, or in larger sizes to be drawn by a horse, or other power.

When it is desired to throw the drill "out of gear" it is only necessary to lift the lever 21 so that the shaft 22 is raised out of the bearings 23 and then lowered into bearings 33. This will move the roller 24 out of the path of the cams 7 so that the wheel 5 is free to rotate without actuating the lever 21.

I have indicated a next row marker shown as broken away at 34 in Fig. 1. Row markers are old, and any convenient form of row marker may be used.

While I have illustrated and described the preferred form of my invention, I do not desire to be limited to the precise details set forth, but desire to avail myself of such variations and changes as come within the scope of the appended claims.

I claim:—

1. A seed drill comprising a frame; a ground wheel mounted in the frame; cams on the periphery of the ground wheel; a seed container; a seed dropping member connected with said container; a lever operatively connected with said seed dropping member; a roller mounted on said lever; and two sets of bearings for said lever, one set of said bearings being adapted to hold the lever with said roller in the path of said cams and the other set of bearings being adapted to hold said lever with said roller out of the path of said cams.

2. A seed drill comprising a frame, a wheel mounted in the frame and having cams thereon; two sets of bearings; a lever; a shaft extending through the lever and adapted to fit both of said sets of bearings, when said shaft is disposed in one set of bearings said lever is adapted to extend into the path of said cams and when such shaft is disposed in the other set of bearings said lever is held out of the path of said cams; a seed dropper; and a flexible connection between the seed dropper and lever.

3. A seed drill comprising a frame; a seed container on the frame; a dropper connected with said seed container; a ground wheel mounted in the frame; cams on the ground-engaging surface of said wheel; a lever pivoted in the frame and having one end adapted for engagement with said cams; a flexible member connected between the other end of said lever and said seed dropper; and resilient means connected with the dropper tending to move the latter in one direction.

4. A seed drill comprising a frame; a seed container on the frame; a dropper connected with said seed container; a ground wheel mounted in the frame; cams on the ground-engaging surface of said wheel; a lever pivoted in the frame and having one end adapted for engagement with said cams; a roller mounted in the frame adjacent the other end of said lever; a flexible member connected with the last-mentioned end of said lever, engaging said roller and connected with said dropper; and a resilient means tending to move the dropper in one direction.

5. A seed drill comprising a frame; a wheel mounted in the frame; cams on said wheel; a lever pivoted in the frame and having one of its ends extending into the path of said cams; a seed dropping member in said frame; a roller mounted in the frame; and a flexible member secured to said seed dropper, engaging said roller and secured to said lever.

In testimony whereof I have signed my name to this specification on this 5th day of August A. D. 1918.

NELS MELLAND.